United States Patent
Ishigooka et al.

(10) Patent No.: US 9,547,492 B2
(45) Date of Patent: Jan. 17, 2017

(54) ARITHMETIC UNITS ACCESSING REDUNDANTLY STORED DATA IN SHARED MEMORY AS PART OF A CONTROL DEVICE FOR A VEHICLE

(71) Applicant: Hitachi Automotive Systems, Ltd., Hitachinaka-shi, Ibaraki (JP)

(72) Inventors: Tasuku Ishigooka, Tokyo (JP); Fumio Narisawa, Tokyo (JP); Hiroaki Komatsu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 247 days.

(21) Appl. No.: 14/379,649

(22) PCT Filed: Jan. 28, 2013

(86) PCT No.: PCT/JP2013/051689
§ 371 (c)(1),
(2) Date: Aug. 19, 2014

(87) PCT Pub. No.: WO2013/125294
PCT Pub. Date: Aug. 29, 2013

(65) Prior Publication Data
US 2015/0039865 A1    Feb. 5, 2015

(30) Foreign Application Priority Data

Feb. 23, 2012   (JP) ................. 2012-036924

(51) Int. Cl.
*G06F 9/30*     (2006.01)
*B60R 16/02*    (2006.01)
*G06F 9/52*     (2006.01)

(52) U.S. Cl.
CPC ............ *G06F 9/3001* (2013.01); *B60R 16/02* (2013.01); *G06F 9/30032* (2013.01); *G06F 9/52* (2013.01)

(58) Field of Classification Search
CPC ................. G06F 9/52; G06F 9/3001
See application file for complete search history.

(56) References Cited

U.S. PATENT DOCUMENTS 5,649,102 A    7/1997   Yamauchi et al.
5,987,376 A *  11/1999  Olson .............. H04L 29/06
                                                709/201

(Continued)

FOREIGN PATENT DOCUMENTS

JP     8-106440 A     4/1996
JP     2003-203062 A  7/2003

(Continued)

OTHER PUBLICATIONS

Corresponding International Search Report dated Mar. 26, 2013 with English Translation (four (4) pages).

*Primary Examiner* — Jacob A Petranek
(74) *Attorney, Agent, or Firm* — Crowell & Moring LLP

(57) ABSTRACT

If exclusive control is used when carrying out update processing or reference processing to a data buffer in a shared memory among plural arithmetic units, waiting time increases and it is difficult to guarantee a real time property. Accordingly, in a control device for a vehicle, a data buffer is multiplexed, and each arithmetic unit carries out update processing and reference processing to a different multiplexed data buffer. An arithmetic unit that is different from the arithmetic unit executing the data update processing synchronizes one data buffer updated by data update processing, with the multiplexed data buffer, in a shorter time than an execution cycle of the data update processing.

11 Claims, 12 Drawing Sheets

(56) References Cited

U.S. PATENT DOCUMENTS

| | | | |
|---|---|---|---|
| 7,406,487 B1* | 7/2008 | Gupta | G06F 17/30575 |
| 8,015,375 B1* | 9/2011 | Gulve | G06F 11/1464 |
| | | | 711/111 |
| 2008/0120478 A1* | 5/2008 | Holt | G06F 9/526 |
| | | | 711/150 |
| 2014/0108516 A1* | 4/2014 | Ekeroth | G06F 11/1658 |
| | | | 709/203 |

FOREIGN PATENT DOCUMENTS

| | | |
|---|---|---|
| JP | 2004-86615 A | 3/2004 |
| JP | 2009-37403 A | 2/2009 |
| JP | 2009-110063 A | 5/2009 |

* cited by examiner

ARITHMETIC UNITS ACCESSING REDUNDANTLY STORED DATA IN SHARED MEMORY AS PART OF A CONTROL DEVICE FOR A VEHICLE

TECHNICAL FIELD

The present invention relates to a technique for updating and referring to data in a shared memory among plural arithmetic units.

BACKGROUND ART

Many vehicle systems of recent years are comprised of an ECU that operates computerized vehicle control equipment, that is, an electronic control unit, and an onboard LAN (local area network) that enables communication between plural ECUs.

In vehicle systems, as the amount of computation increases, ECUs equipped with a multi-core microcontroller (multi-core microcomputer) equipped with plural arithmetic units (CPUs) begin to be employed. In a multi-core microcomputer, a data conflict can occur when plural CPUs access shared data (write data or read data) in a shared memory such as dual-port RAM.

Exclusive control is known as a method for avoiding data conflicts. Exclusive control is a technique for realizing the absence of simultaneous occurrence of timings of accessing shared data, and a semaphore or the like is used. A semaphore is acquired before accessing shared data, and if the acquisition is successful, update (writing) of or reference to (reading) data is carried out. After the update of or reference to the data is finished, the semaphore is released. The release of the semaphore can only be done by the CPU or task that acquires the semaphore. If another CPU tries to acquire a semaphore when one CPU is acquiring the semaphore, a waiting state sets in until the semaphore is released. As the semaphore is released, one CPU of the CPUs waiting for the release of the semaphore can acquire the semaphore. The semaphore among multiple cores is realized by such hardware that plural CPUs cannot acquire the semaphore simultaneously.

Also, in the development of vehicle systems, every time a new vehicle model is developed, addition of a new function or change in the performance of the multi-core microcomputer installed on the ECU can take place, and the allocation of CPUs that execute software needs to be changed. Since work to change software is needed when changing the allocation of CPUs, the number of processes to reuse the development resources of software increases.

In the following PTL 1, data in a shared memory which is updated and referred to from both arithmetic units is multiplexed, and data for reference and data for update are switched via plural pointers. If a latest value is newly written in a free memory, the pointer indicating the data for reference is updated. When carrying out the pointer update or reference in this manner, a data conflict between the arithmetic units occurs and therefore exclusive control is used. When reference processing is executed, a pointer for reference is newly created to refer to the multiplexed data. Therefore, it is possible to access the shared data without thinking about the executing CPU.

CITATION LIST

Patent Literature

PTL 1: JP-A-2009-110063

SUMMARY OF INVENTION

Technical Problem

In the above PTL 1, exclusive control is used for update of or reference to the pointer. Since all the CPUs access this pointer, a waiting time is generated in the other CPUs by exclusive control, and there is a problem that this waiting time cannot be tolerated in high-speed control such as engine control that requires a strict real-time property. Particularly if switching of a task that is being executed (hereinafter, preemption) occurs during exclusive control and the task is temporarily suspended, the waiting time of the other CPUs increases and can cause a serious delay. Although there is a method of interrupt inhibition so that preemption will not occur, if the number of shared data is large, an increase in the interrupt inhibition time largely affects the processing by the other CPUs. Therefore, this method cannot be used often.

In order to solve the foregoing problems, it is an object of the invention to provide a technique for accessing shared data without any waiting time due to exclusive control, in a multi-core microcomputer equipped with a shared memory.

Solution to Problem

In order to solve the foregoing problems, a control device for vehicle according to the invention includes plural arithmetic units and a shared memory in which shared data accessed in common by the plural arithmetic units is stored redundantly. The shared memory has a program area and a data area. The data area has plural data buffers in which the shared data is stored redundantly, corresponding to each of the plural arithmetic units. The program area includes: a data update processing unit for one arithmetic unit of the plural arithmetic units to update a data buffer corresponding to the one arithmetic unit, store new shared data, and report the update of the shared data to another control device of the plural arithmetic units; a data synchronizing unit for the another arithmetic unit to copy the shared data in the data buffer corresponding to the one arithmetic unit to the data buffer corresponding to the another arithmetic unit after the report; and a data reference processing unit for the another arithmetic unit to refer to the data buffer corresponding to the another arithmetic unit.

Advantageous Effect of Invention

According to the control device for vehicle according to the invention, the control device for vehicle refers to and updates data for each CPU while guaranteeing consistency of data by synchronization processing. Therefore, it is possible to access data without delay due to exclusive control.

DESCRIPTION OF EMBODIMENTS

In a control device for vehicle according to the invention, data accessed by both of plural arithmetic units is multiplexed and target data to be accessed is switched according to the CPU where an application is executed, thus preventing occurrence of a data access conflict between applications. Also, synchronization processing to make values of multiplexed data coincident is executed, thereby guaranteeing consistency of data. Hereinafter, embodiments of the invention will be described, using the drawings.

Embodiment 1

Figure 1:
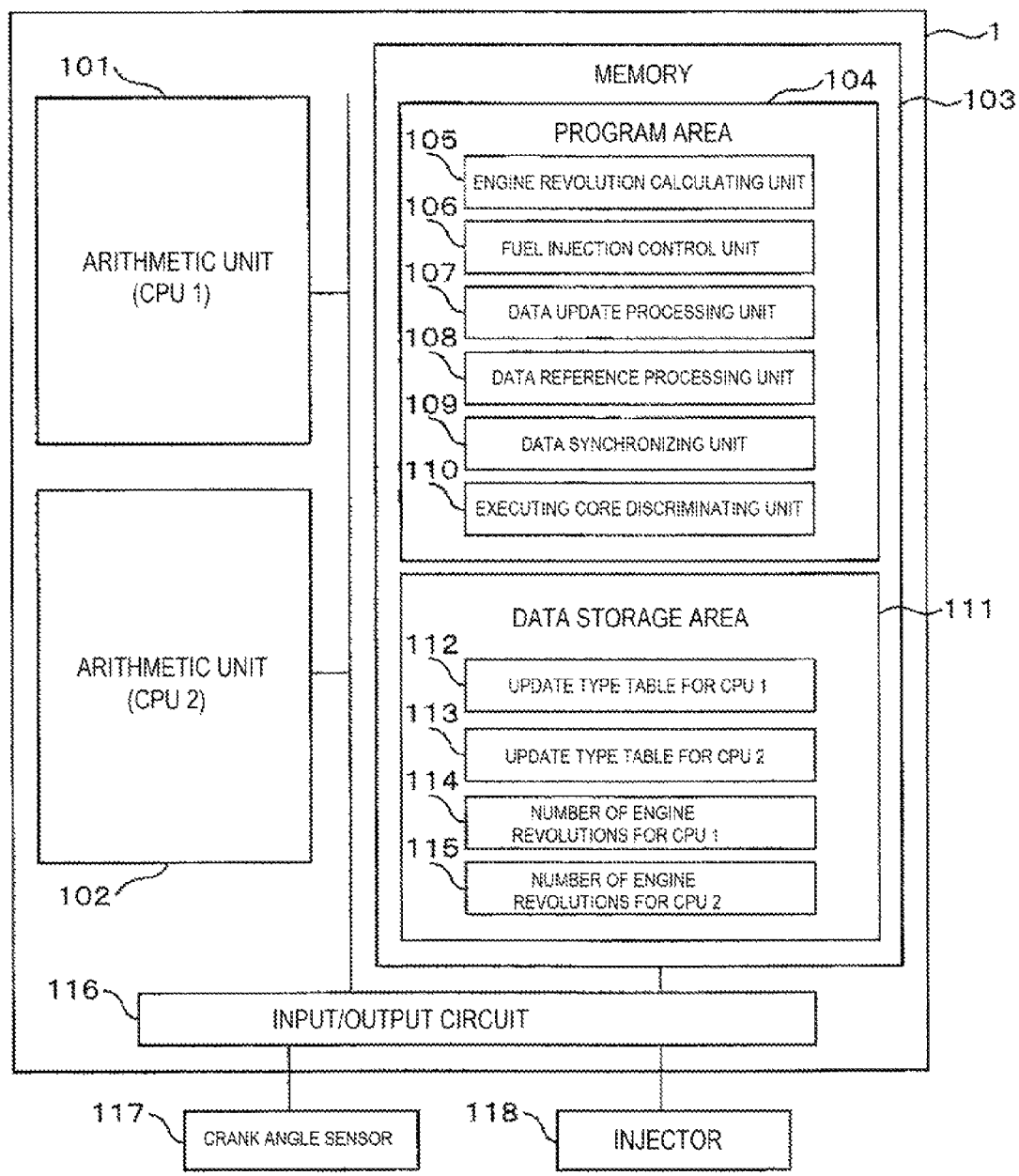
FIG. 1 is a configuration view of an engine control ECU according to Embodiment 1.

FIG. 1 is a configuration view of an engine control ECU 1 of a vehicle system according to Embodiment 1 of the invention. The engine control ECU 1 has an arithmetic unit 101 (CPU 1), an arithmetic unit 102 (CPU 2), a shared memory 103, and an input/output circuit 116. The shared memory 103 may be, for example, a dual-port RAM, high-speed accessible SDRAM or the like. Also, input signals from various sensors such as a crank angle sensor 117 and an air intake sensor of the engine, not shown, are inputted to the engine control ECU 1, which then controls an actuator of an injector 118 or the like for injecting a fuel to the engine. The shared memory 103 has a program area 104 related to control processing of the actuator of the injector 108 or the like, and a data storage area 111 for storing necessary data for control, in a duplicate redundant manner. The program area 104 has an engine revolution calculating unit 105 for calculating the number of engine revolutions from the crank angle sensor, a fuel injection control unit 106 for computing the period and timing of injecting a fuel to the engine, a data update processing unit 107 for storing data of the number of engine revolutions or the like into the data storage area 111, a data reference processing unit 108 for acquiring the data of the number of engine revolutions or the like from the data storage area 111, a data synchronizing unit 109 for synchronizing the data that is made redundant, between plural CPUs, and an executing core discriminating unit 110 for discriminating the CPU that is executing data update processing or data reference processing. The data storage area 111 stores an update type table for CPU 1 112 described with reference to FIG. 2 later, an update type table for CPU 2 113 of FIG. 3, a number of engine revolutions for CPU 1 114 of FIG. 4, and a number of engine revolutions for CPU 2 115 of FIG. 5. While two arithmetic units, two update type tables, and two numbers of engine revolutions are used in Embodiment 1 for convenience of explanation, these are not limiting. For example, three arithmetic units, three update type tables, and three numbers of engine revolutions may be used, or four arithmetic units, four update type tables, and four numbers of engine revolutions may be used.

Figure 2:
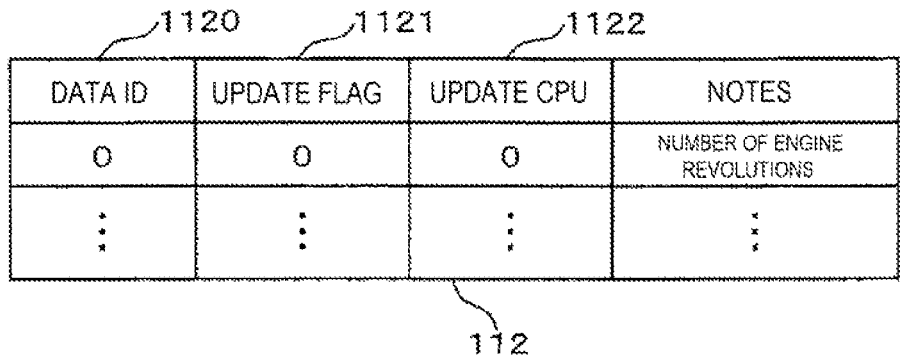
FIG. 2 is an example of an update type table for CPU 1.

FIG. 2 is an example of the update type table for CPU 1 112. This table shows a data ID 1120 identifying the type of data, an update flag 1121 indicating the presence/absence of update of data, and a CPU number on which the data indicated by the data ID is updated. While the update type table for CPU 1 is used in Embodiment 1 for convenience of explanation, this is not limiting. For example, the configuration of the table may be different and it need not be implemented as a table. The update type table for CPU 1 112 shows data which the arithmetic unit 101 should be synchronized with.

Figure 3:
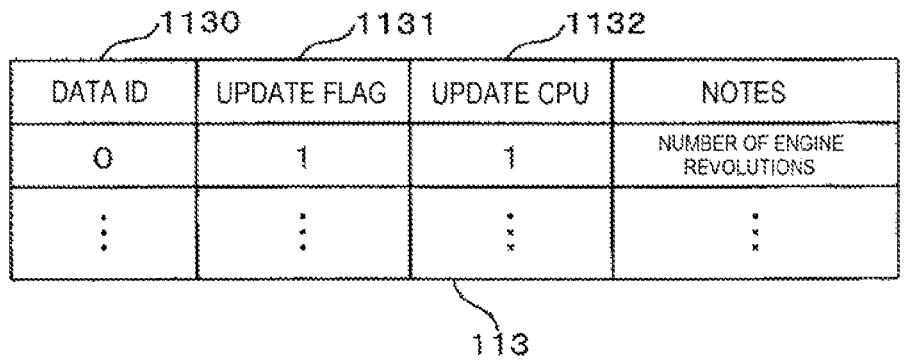
FIG. 3 is an example of an update type table for CPU 2.

FIG. 3 is an example of the update type table for CPU 2 113. The items in this table are similar to the update type table for CPU 1 112. While the update type table for CPU 2 is used in Embodiment 1 for convenience of explanation, this is not limiting. For example, the configuration of the table may be different and it need not be implemented as a table. The table need not be coincident with the update type table for CPU 1. The update type table for CPU 2 113 shows data which the arithmetic unit 102 should be synchronized with.

Figure 4:
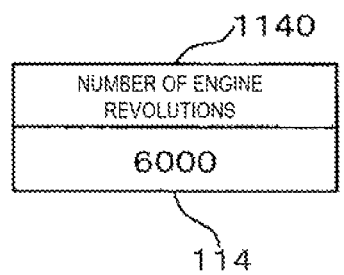
FIG. 4 is an example of a number of engine revolutions for CPU 1.

FIG. 4 is an example of a variable of the number of engine revolutions for CPU 1 114. A number of engine revolutions for CPU 1 1140 stores the number of engine revolutions. While the number of engine revolutions for CPU 1 1140 is used in Embodiment 1 for convenience of explanation, this is not limiting. For example, the data may be implemented as a structure that is an aggregate of plural data, instead of a single variable.

Figure 5:
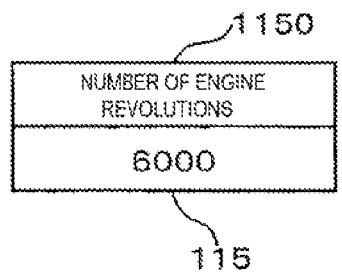
FIG. 5 is an example of a number of engine revolutions for CPU 2.

FIG. 5 is an example of a variable of the number of engine revolutions for CPU 2 115. A number of engine revolutions for CPU 2 1150 stores the number of engine revolutions. While the number of engine revolutions for CPU 1 1150 is used in Embodiment 1 for convenience of explanation, this is not limiting. For example, the data may be implemented as a structure that is an aggregate of plural data, instead of a single variable, and the implementation method may not be the same as the number of engine revolutions for CPU 1 114.

Figure 6:
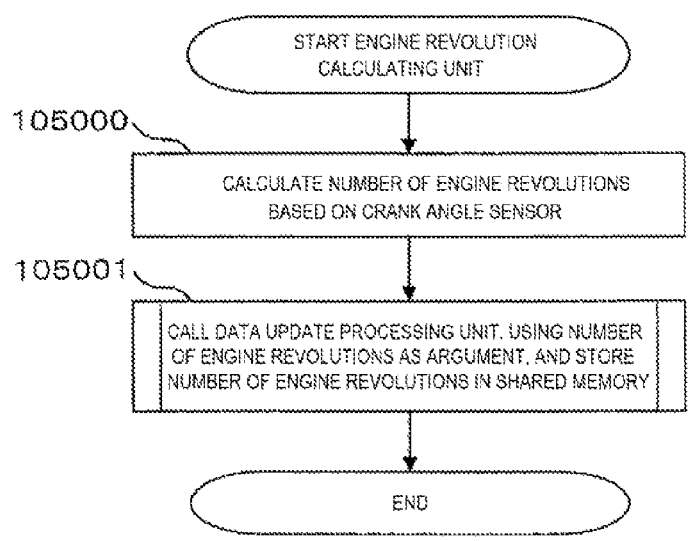
FIG. 6 is an operation flow of an engine revolution calculating unit.

Hereinafter, a flow in which the engine control ECU 1 having the plural arithmetic units calculates the number of engine revolutions and carries out fuel injection will be described. In Embodiment 1, it is assumed that the arithmetic unit 101 (CPU 1) is allocated to always execute the engine revolution calculating unit 105, the arithmetic unit 102 (CPU 2) is allocated to always execute the fuel injection control unit 106, and the data update processing unit 107, the data reference processing unit 108, the data synchronizing unit 109 and the executing core discriminating unit 110 can be executed from both of the arithmetic units. However, this is not limiting. FIG. 6 is an operation flow of the engine revolution calculating unit 105. Hereinafter, each step in FIG. 6 will be described.

(FIG. 6: Step 105000)

The engine revolution calculating unit 105 calculates the number of engine revolutions based on the crank angle sensor 117.

(FIG. 6: Step 105001)

The engine revolution calculating unit 105 calls the data update processing unit 107, using the calculated number of engine revolutions as an argument, and stores the number of engine revolutions in the shared memory 103.

In this way, the number of engine revolutions is calculated and the number of engine revolutions is stored in the shared memory.

Figure 7:
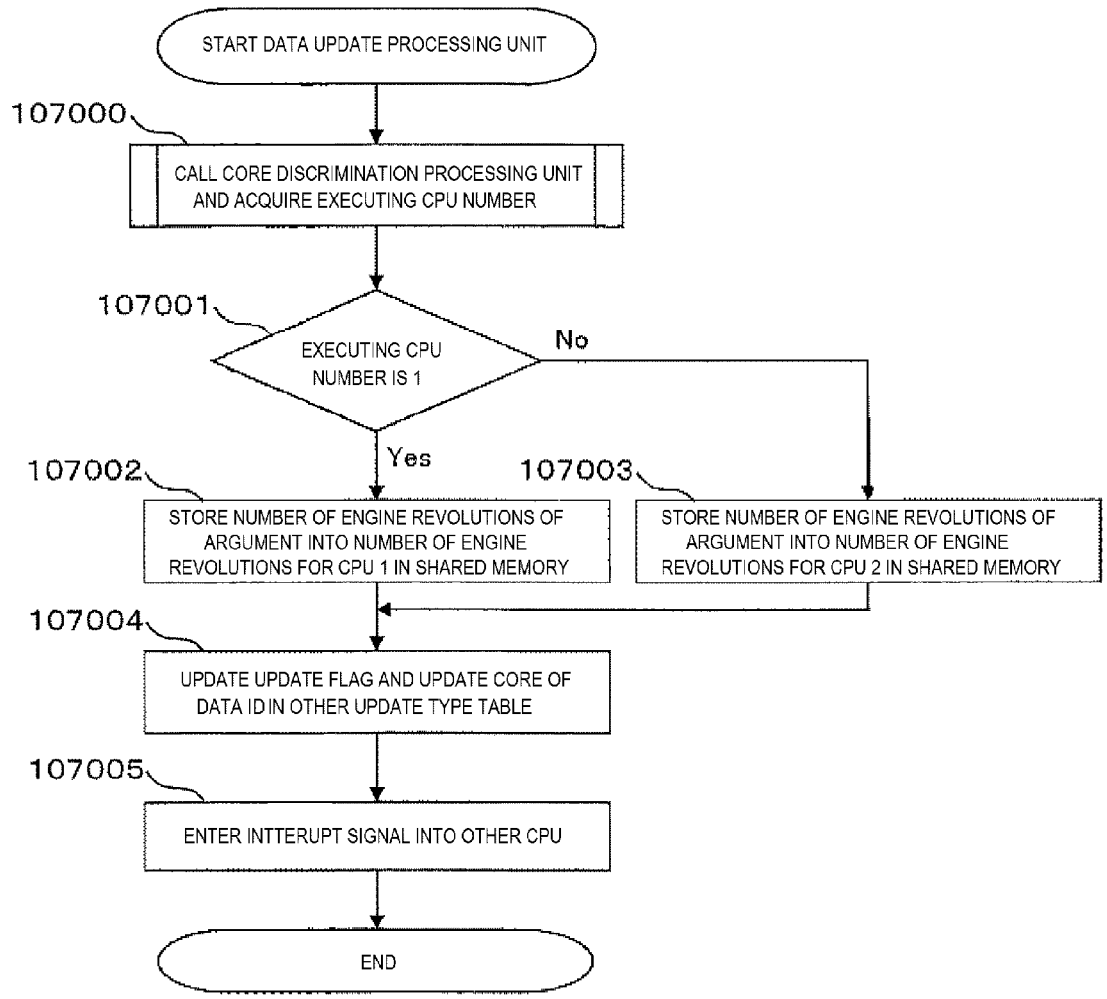
FIG. 7 is an operation flow of a data update processing unit according to Embodiment 1.

FIG. 7 is an operation flow of the data update processing unit 107. Hereinafter, each step in FIG. 7 will be described.

(FIG. 7: Step 107000)

The data update processing unit 107 calls the core discrimination processing unit 110 and acquires the CPU number that is executing the data update processing unit 107.

(FIG. 7: Step 107001)

The data update processing unit 107 goes to Step 107002 if the acquired CPU number is 1, and goes to Step 107003 if the CPU number is not 1, for example, the CPU number is 2.

(FIG. 7: Step 107002)

The data update processing unit 107 stores the number of engine revolutions of the argument in the number of engine revolutions for CPU 1 114 in the shared memory 103. The two arithmetic units in Embodiment 1 can update the storage processing into the number of engine revolutions for CPU 1 114 by an arithmetic unit 1 command and therefore do not execute intra-core exclusive control. Intra-core exclusive control refers to exclusive control that prevents a data conflict within the same CPU, such as Resource of OSEK OS defined by OSEK/VDX. Even if the arithmetic unit 1 command does not enable update, in the case of a system where it is defined that preemption does not occur during the execution of Step 107002, intra-core exclusive control need not be executed, either. While the single variable, that is, the number of engine revolutions for CPU 1 114, is updated in Embodiment 1 for convenience of explanation, this is not limiting. For example, two or more variables may be updated. At this time, in the case where a system where it is defined that preemption does not occur during the execution of Step 107002, intra-core exclusive control need not be executed. However, if preemption occurs, intra-core exclusive control needs to be executed. Also, if a multi-core OS having scheduling in the TDMA format is used, data update processing and data reference processing corresponding to the same data type can be scheduled not at the same time. Therefore, this technique can be applied easily.

(FIG. 7: Step 107003)

The data update processing unit 107 stores the number of engine revolutions of the argument into the number of engine revolutions for CPU 2 115 in the shared memory 103. The two arithmetic units in Embodiment 1 can update the storage processing into the number of engine revolutions for CPU 2 115 by an arithmetic unit 1 command and therefore do not execute intra-core exclusive control. While the single variable, that is, the number of engine revolutions for CPU 2 115, is updated in Embodiment 1 for convenience of explanation, this is not limiting, as in Step 107002.

(FIG. 7: Step 107004)

The data update processing unit 107 searches for a string that is equal to the data ID indicating the number of engine revolutions, from the data ID in the update type table, and updates a target update flag and update core, in order to notify the other arithmetic unit of the update of the number of engine revolutions for CPU 1 114. In Embodiment 1, the CPU 1 is allocated to update the data of the number of engine revolutions and the CPU 2 is allocated to refer to the data of the number of engine revolutions, and therefore the update type table to be updated is only the update type table for CPU 2. In Embodiment 1, when the update flag is 0, it indicates that data is not updated, and when the update flag is 1, it indicates that data is updated. However, this is not limited to binary data and may be an arbitrary variable. Also, while the CPU number is stored in the update core in Embodiment 1, this is not limiting as long as the arithmetic unit can be identified.

(FIG. 7: Step 107005)

The data update processing unit 107 enters an interrupt signal to the other CPU, that is, the arithmetic unit 102 in this embodiment, and ends the processing.

In this way, the number of engine revolutions is stored in the shared memory according to the CPU number, then the update type table is updated, and an interrupt signal is entered into the other CPU. Thus, the other CPU can refer to the latest value of the updated number of engine revolutions without having a waiting time. It should be noted that this interrupt signal may be set, for example, as top priority.

Figure 8:
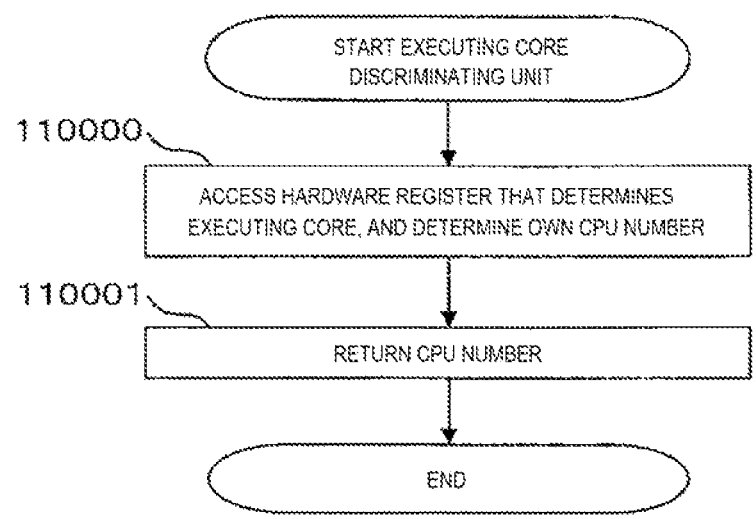
FIG. 8 is an operation flow of an executing core discriminating unit.

FIG. 8 is an operation flow of the executing core discriminating unit 110. Hereinafter, each step in FIG. 8 will be described.

(FIG. 8: 110000)

The executing core discriminating unit 110 accesses a hardware register that determines the executing core, thus determining and acquiring its own CPU number. While the CPU number is determined via the hardware register in Embodiment 1 for convenience of explanation, this is not limiting.

(FIG. 8: 110001)

The executing core discriminating unit 110 returns the acquired CPU number.

In this way, the CPU number of the arithmetic unit executing the executing core discriminating unit can be acquired.

Figure 9:
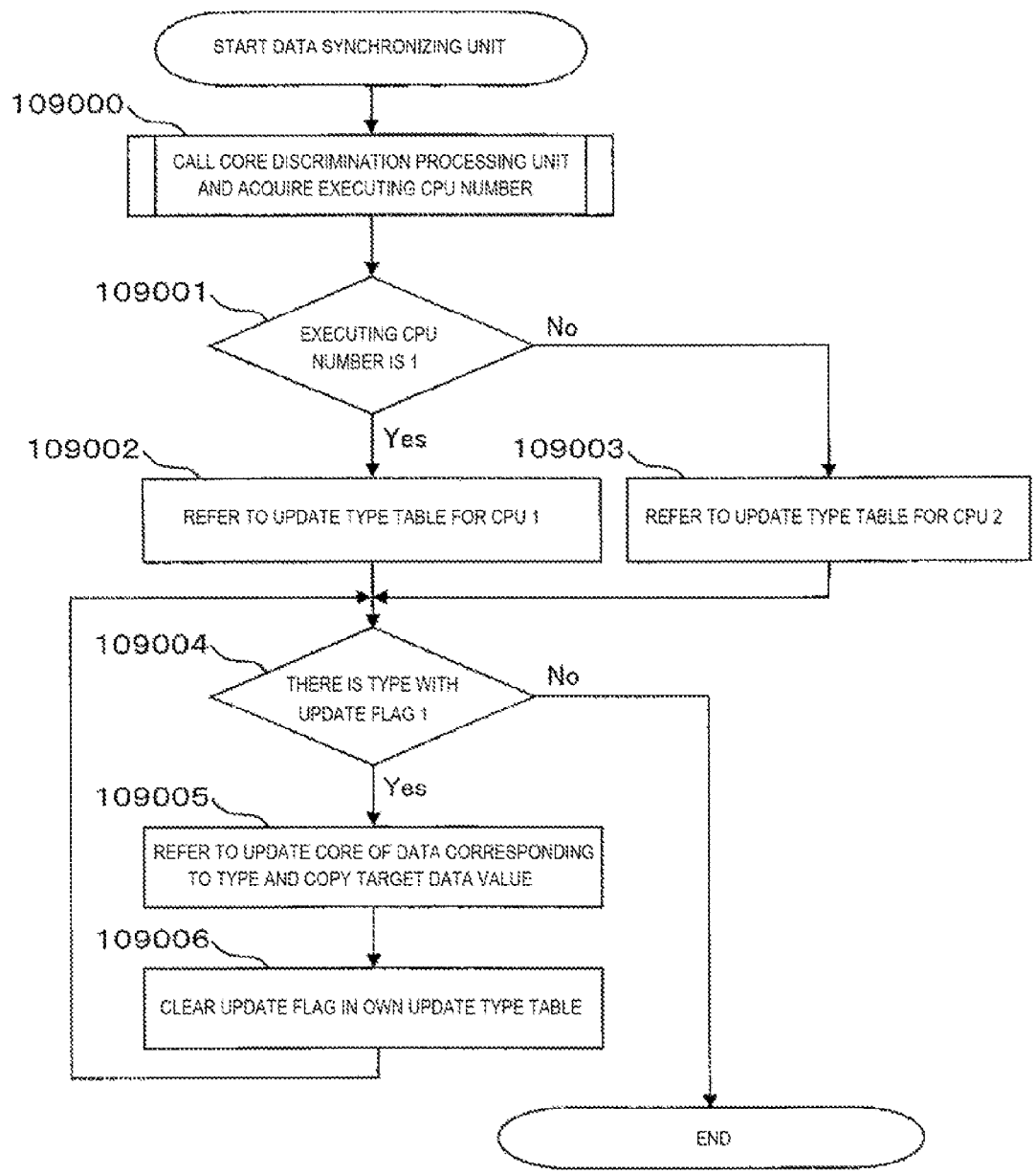
FIG. 9 is an operation flow of a data synchronizing unit.

FIG. 9 is an operation flow of the data synchronizing unit 109. Hereinafter, each step in FIG. 9 will be described.

(FIG. 9: 109000)

The data synchronizing unit 109 calls the core discrimination processing unit 110 and acquires the CPU number executing the data update processing unit 107.

(FIG. 9: 109001)

The data synchronizing unit 109 goes to Step 109002 if the acquired CPU number is 1, and goes to Step 109003 if the CPU number is not 1, for example, the CPU number is 2.

(FIG. 9: 109002)

The data synchronizing unit 109 refers to the update type table for CPU 1 112 in the shared memory 103.

In Embodiment 1, since it is started up by the interrupt signal of top priority, no data conflicts occur unless data update processing is carried out again in a very short time. Therefore, exclusive control is not used. However, the startup method is not limited to this. For example, in the case of a system where the data reference processing unit is executed before the next data update processing unit is executed and where the data synchronizing unit is called after the execution of the data update processing unit and before the execution of the data reference processing unit, exclusive control need not be used, either. Also, even without the interrupt signal of top priority, exclusive control need not be used if the data synchronizing unit can be started up before the next update processing is executed. It should be noted that the data update processing unit and the data reference processing unit are executed in the same cycle, or the data update processing unit is executed in a shorter cycle than the data reference processing unit.

(FIG. 9: 109003)

The data synchronizing unit 109 refers to the update type table for CPU 2 114 in the shared memory 103. As in Step 109002, exclusive control is not used. Also, the startup method is not limited to this.

(FIG. 9: 109004)

If there is a type having an update flag of 1 in the update type table that is referred to, that is, if there is a string indicating an update, the data synchronizing unit 109 goes to Step 109005. If there is no string indicating an update, the data synchronizing unit 109 ends the processing. While the update of data is reported with an update flag in Embodiment 1, this is not limiting. For example, the interrupt signal itself may be made to mean that data is updated, or a dedicated data synchronizing unit may be implemented for each updated data.

(FIG. 9: 109005)

The data synchronizing unit 109 refers to the update core of the type having the update flag 1 in the update type table and identifies the update CPU. By this, the data synchronizing unit 109 learns the data of the latest value and copies the target data value to its own data. In Embodiment 1, since the update core is 1 as shown in FIG. 3, the value of the number of engine revolutions for CPU 1 114 is copied to the number of engine revolutions for CPU 2 115.

(FIG. 9: 109006)

The data synchronizing unit 109 clears the update flag in its own update type table corresponding to the copied data to 0 and goes to Step 109004.

In this way, the data value for each core can be made coincident without using exclusive control between cores.

Figure 10:
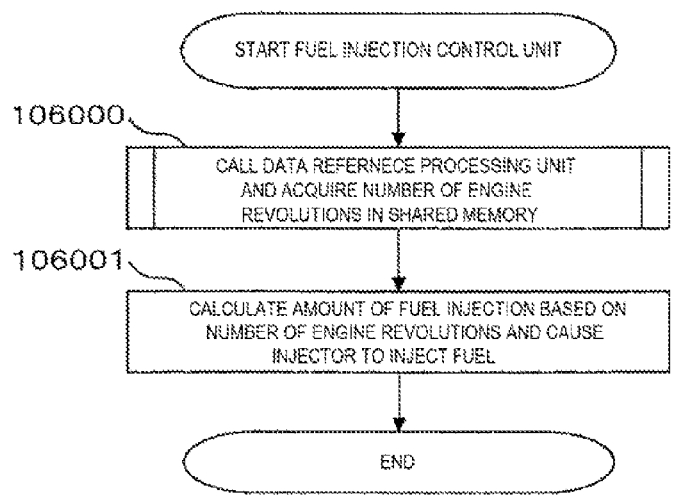
FIG. 10 is an operation flow of a fuel injection control unit.

FIG. 10 is an operation flow of the fuel injection control unit 106. Hereinafter, each step in FIG. 10 will be described.

(FIG. 10: 106000)

The fuel injection control unit 106 calls the data reference processing unit and acquires the number of engine revolutions in the shared memory.

(FIG. 10: 106001)

The fuel injection control unit 106 calculates the amount of fuel injection based on the acquired number of engine revolutions and causes the injector to inject the fuel.

In this way, the number of engine revolutions is acquired from the shared memory, and the injector is controlled.

Figure 11:
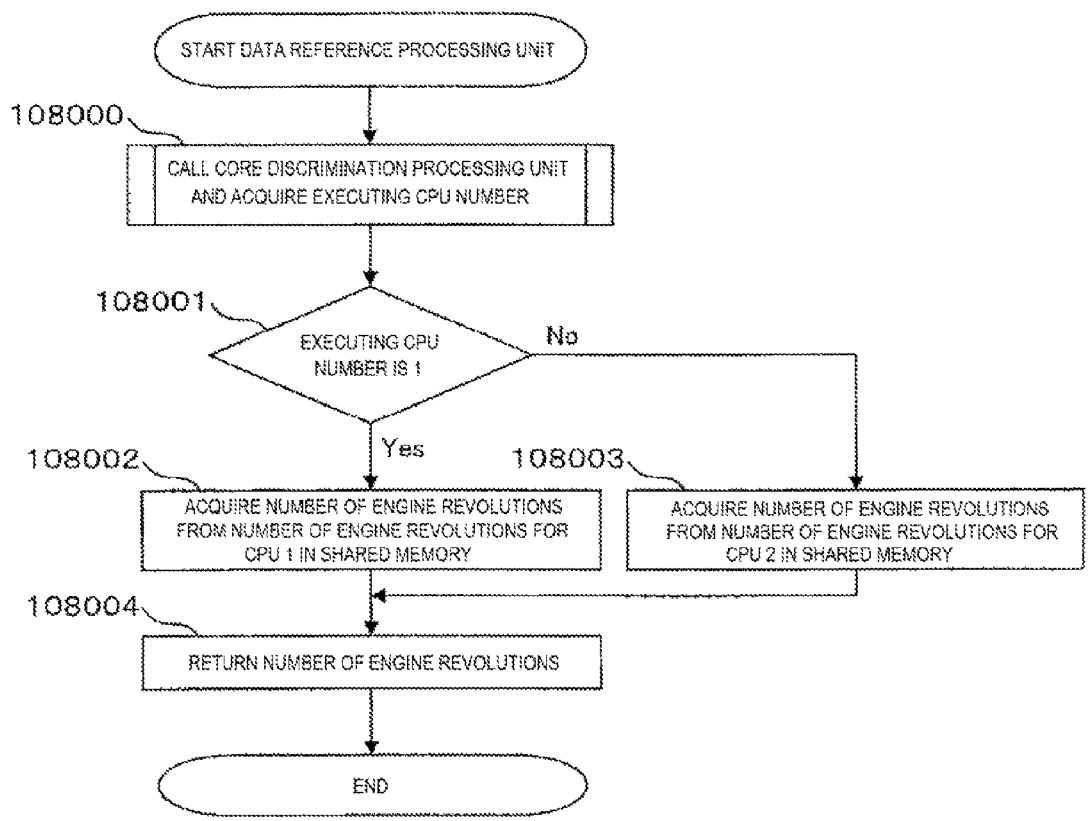
FIG. 11 is an operation flow of a data reference processing unit.

FIG. 11 is an operation flow of the data reference processing unit 108. Hereinafter, each step in FIG. 11 will be described.

(FIG. 11: 108000)

The data reference processing unit 108 calls the core discrimination processing unit 110 and acquires the CPU number executing the data update processing unit 107.

(FIG. 11: 108001)

The data reference processing unit 108 goes to Step 108002 if the acquired CPU number is 1, and goes to Step 108003 if the CPU number is not 1, for example, if the CPU number is 2.

(FIG. 11: 108002)

The data reference processing unit 108 acquires the number of engine revolutions from the number of engine revolutions for CPU 1 114 in the shared memory 103. The two arithmetic units in Embodiment 1 can update the acquisition processing from the number of engine revolutions for CPU 1 114 by an arithmetic unit 1 command and therefore do not execute intra-core exclusive control. Even if the arithmetic unit 1 command does not enable update, in the case of a system where it is defined that preemption does not occur during the execution of Step 107802, intra-core exclusive control need not be executed, either. While the single variable, that is, the number of engine revolutions for CPU 1 114, is updated in Embodiment 1 for convenience of explanation, this is not limiting. For example, two or more variables may be updated. At this time, in the case where a system where it is defined that preemption does not occur during the execution of Step 108002, intra-core exclusive control need not be executed. However, if preemption occurs, intra-core exclusive control needs to be executed.

(FIG. 11: 108003)

The data reference processing unit 108 acquires the number of engine revolutions from the number of engine revolutions for CPU 2 115 in the shared memory 103. The two arithmetic units in Embodiment 1 can update the storage processing into the number of engine revolutions for CPU 2 115 by an arithmetic unit 1 command and therefore do not execute intra-core exclusive control. While the single variable, that is, the number of engine revolutions for CPU 2 115, is updated in Embodiment 1 for convenience of explanation, this is not limiting, as in Step 108002.

(FIG. 11: 108004)

The data reference processing unit 108 returns the acquired number of engine revolutions and ends the processing.

In this way, the number of engine revolutions can be acquired from the shared memory.

While the update type table is used to report updated data in Embodiment 1, this is not limiting. For example, the interrupt signal itself may be made to mean that data is updated, or a dedicated data synchronizing unit may be implemented for each updated data.

Also, while the data synchronizing unit is started up by the interrupt signal in Embodiment 1, this is not limiting. For example, a task for starting up the data synchronizing unit and the data update processing unit in order may be implemented.

Also, while the executing core discriminating unit is executed by the data update processing unit and the data reference processing unit in Embodiment 1, this is not limiting. For example, in a system where the arithmetic unit that executes the engine revolution calculating unit and the fuel injection control unit is not changed during the execution, only one-time execution at the initial execution suffices.

In this way, according to this Embodiment 1, since it is possible to update and refer to data by using the shared memory without using exclusive control, the technique is suitable for a vehicle system where data needs to be communicated at a high speed between plural arithmetic units, as in engine control. For example, in engine control, arithmetic operation that is necessary for injector control is executed synchronously with engine revolutions. Since the arithmetic cycle becomes shorter as the engine revolves at higher speeds, it is preferable to do as in this Embodiment 1, which can eliminate exclusive control.

Also, according to this Embodiment 1, as the data synchronizing unit is started up by the interrupt signal of top priority, it is easier to start up the data synchronizing unit before the data update processing unit is executed next time, and it is possible to restrain the number of development processes in the development. The technique is suitable for a vehicle system where the data update processing unit is started up at a constant interval.

Moreover, according to this Embodiment 1, in applications such as the engine revolution calculation processing unit and the fuel injection control unit, by utilizing the data update processing unit and the data reference processing unit, data can be updated or referred to without thinking about which arithmetic unit is executing the application. Therefore, even if the executing arithmetic unit is changed at the time of developing a new vehicle model, it suffices to change only a small number of parts and therefore the number of development processes of software can be reduced.

Embodiment 2

Embodiment 2 is an example where three arithmetic units are provided and where data that is not used for arithmetic operation in control arithmetic operation of an engine revolution calculating unit and control arithmetic operation of a fuel injection control unit are synchronized by a data synchronizing unit. While an example using three arithmetic units is described in this embodiment, this embodiment can be applied as long as plural arithmetic units exist.

Figure 12:
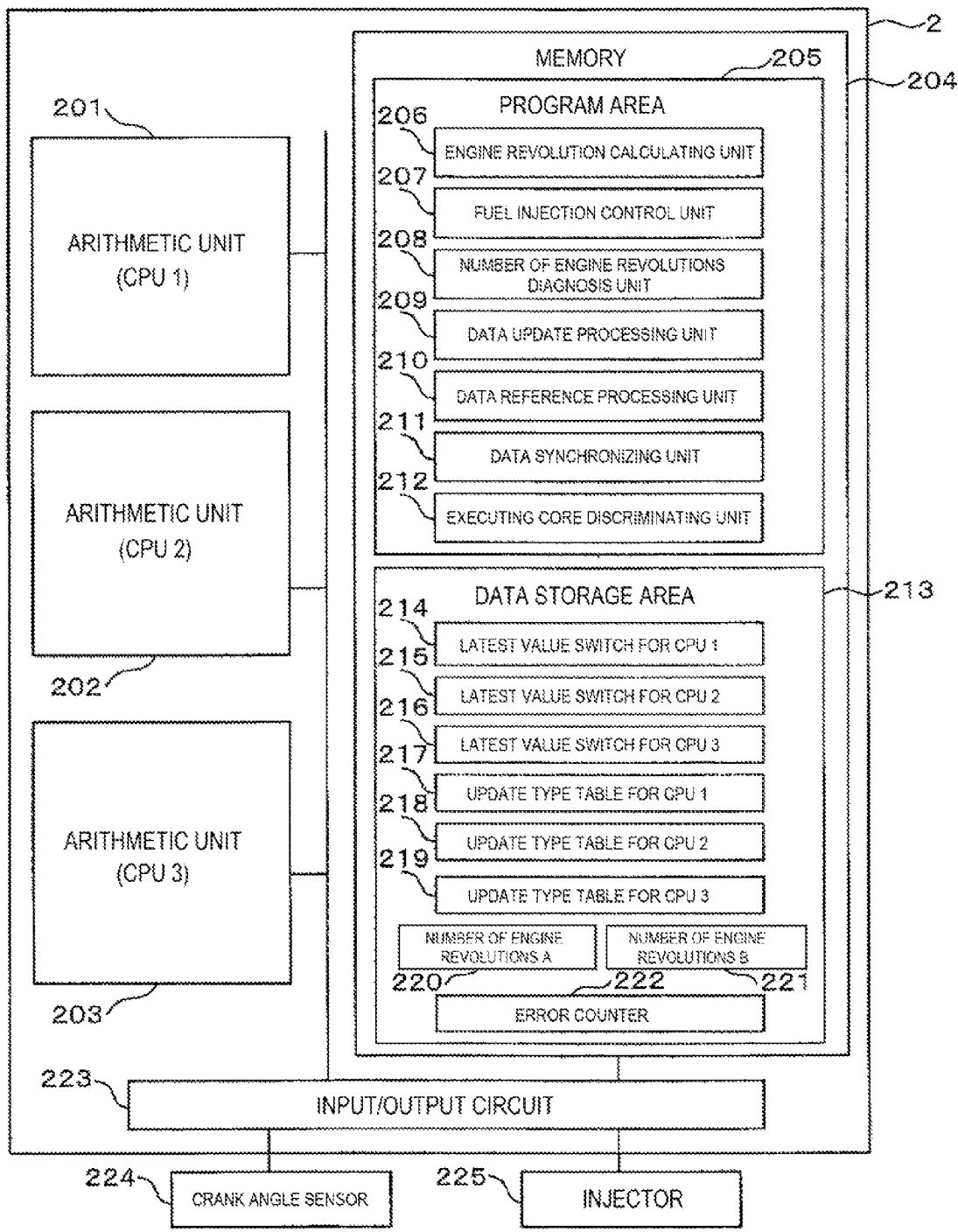
FIG. 12 is a configuration view of an engine control ECU according to Embodiment 2.

FIG. 12 is a configuration view of an engine control ECU 2 of a vehicle system according to Embodiment 2 of the invention. The engine control ECU has an arithmetic unit 201 (CPU 1), an arithmetic unit 202 (CPU 2), an arithmetic unit 203 (CPU 3), a memory 204, an input/output circuit 223, a crank angle sensor 224, and an injector 225.

The memory 204 has a program area 205 and a data storage area 213. The program area 205 has an engine revolution calculating unit 206, a fuel injection control unit 207, a number of engine revolutions diagnosis unit 208, a data update processing unit 209, a data reference processing unit 210, a data synchronizing unit 211, and an executing core discriminating unit 212. The data storage area 213 has a latest value switch for CPU 1 214 described with reference to FIG. 13 later, a latest value switch for CPU 2 215 of FIG. 14, a latest value switch for CPU 3 216 of FIG. 15, an update type table for CPU 1 217 similar to Embodiment 1, an update type table for CPU 2 218, an update type table for CPU 2 219, a number of engine revolutions A 220 of FIG. 16, a number of engine revolutions B 221 of FIG. 17, and an error counter 222 of FIG. 18.

Figure 13:
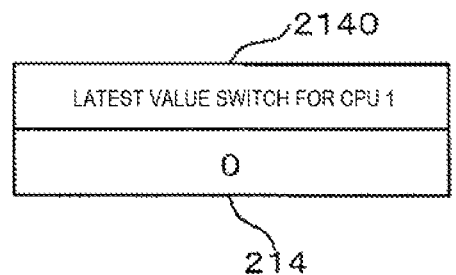
FIG. 13 is an example of a latest value switch for CPU 1.

FIG. 13 is an example of the latest value switch for CPU 1 214. If the value of a latest value switch for CPU 1 2140 is 0, it indicates that the latest value of the number of engine revolutions is stored in the number of engine revolutions A 220. If the value is 1, it indicates that the latest value is stored in the number of engine revolutions B 221. The value of the latest value switch for CPU 1 2140 is updated when the arithmetic unit 201 executes the data update processing unit or executes the data synchronizing unit.

Figure 14:
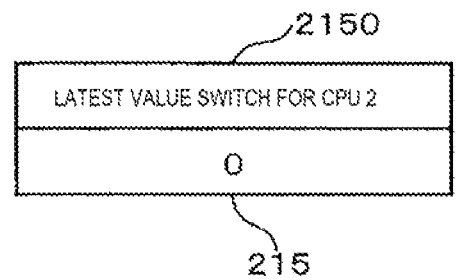
FIG. 14 is an example of a latest value switch for CPU 2.

FIG. 14 is an example of the latest value switch for CPU 2 215. If the value of a latest value switch for CPU 2 2150 is 0, it indicates that the latest value of the number of engine revolutions is stored in the number of engine revolutions A 220. If the value is 1, it indicates that the latest value is stored in the number of engine revolutions B 221. The value of the latest value switch for CPU 2 2150 is updated when the arithmetic unit 202 executes the data update processing unit or executes the data synchronizing unit.

Figure 15:
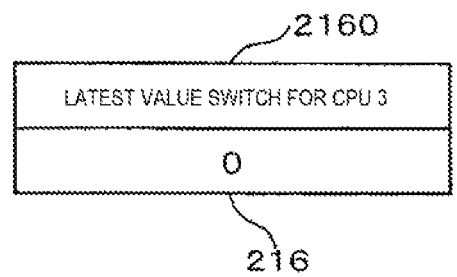
FIG. 15 is an example of a latest value switch for CPU 3.

FIG. 15 is an example of the latest value switch for CPU 3 216. If the value of a latest value switch for CPU 3 2160 is 0, it indicates that the latest value of the number of engine revolutions is stored in the number of engine revolutions A 220. If the value is 1, it indicates that the latest value is stored in the number of engine revolutions B 221. The value of the latest value switch for CPU 3 2160 is updated when the arithmetic unit 203 executes the data update processing unit or executes the data synchronizing unit.

It should be noted that the latest value switch for CPU 1 214, the latest value switch for CPU 2 215 and the latest value switch for CPU 3 216 may be not only implemented in areas within the memory 204 but also implemented by hardware outside the memory 204.

Figure 16:
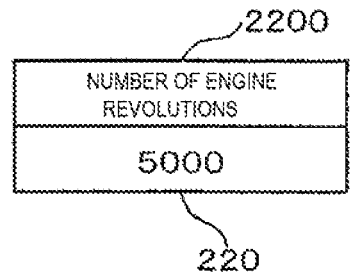
FIG. 16 is an example of a number of engine revolutions A.
Figure 17:
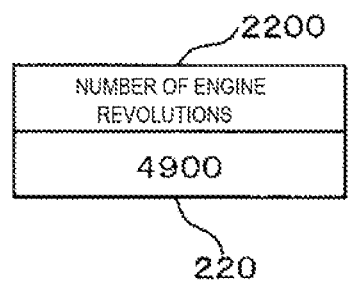
FIG. 17 is an example of a number of engine revolutions B.

FIG. 16 is an example of the number of engine revolutions A 220. FIG. 17 is an example of the number of engine revolutions B 221. One of the number of engine revolutions A 220 and the number of engine revolutions B 221 always has the latest value stored therein and therefore is a target to be referred to, whereas the other, in which the latest value is not stored, is a target to be updated. In the target to be updated, the latest value is to be stored by the next update. That is, one of them has the latest value alternately and the switch for the latest value indicates the latest value. However, this is not limiting. For example, a buffer for the number of engine revolutions of the latest value and a buffer for the number of engine revolutions of the target of next update may be indicated by using pointers, instead of using the switches. However, since the pointers are logical values indicating the positions of the memory and register, an abnormality showing a wrong position can occur. In this embodiment, since the switches are used instead of pointers, reliability can be improved.

Figure 18:
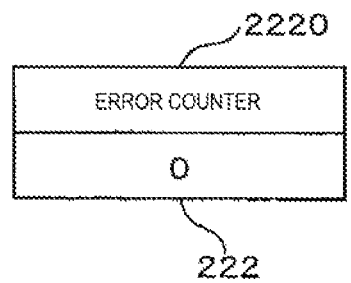
FIG. 18 is an example of an error counter.

FIG. 18 is an example of the error counter 222. The value of an error counter 2220 is a value that is incremented when the number of engine revolutions diagnosis unit determines that the value of the number of engine revolutions is abnormal.

Hereinafter, a flow in which the engine control ECU 2 having the plural arithmetic units calculates the number of engine revolutions and carries out fuel injection will be described mainly in terms of the differences from Embodiment 1.

The engine revolution calculating unit 206 carries out a similar operation to the operation shown in FIG. 6 of the engine revolution calculating unit 105. The fuel injection control unit 207 carries out a similar operation to the operation shown in FIG. 10 of the fuel injection control unit 106. The data synchronizing unit 211 carries out an operation such that the operation shown in FIG. 9 of the data synchronizing unit 109 is extended so that it can be carried out by the three CPUs. The data synchronizing unit determines whether the latest value switch for each CPU is updated or not, by referring to the update type table for each CPU, and copies the value of the updated latest value switch to its own latest value switch. When the arithmetic unit 201 updates the latest value switch for CPU 1 214 and enters an interrupt signal, the data synchronizing unit 211 executed by the arithmetic unit 202 copies the value of the latest value switch for CPU 1 214 to the latest value switch for CPU 2 215, and the data synchronizing unit 211 executed by the arithmetic unit 203 copies the value of the latest value switch for CPU 1 214 to the latest value switch for CPU 3 216. The executing core discriminating unit 212 carries out a similar operation to the operation shown in FIG. 8 of the executing core discriminating unit 110.

Figure 19:
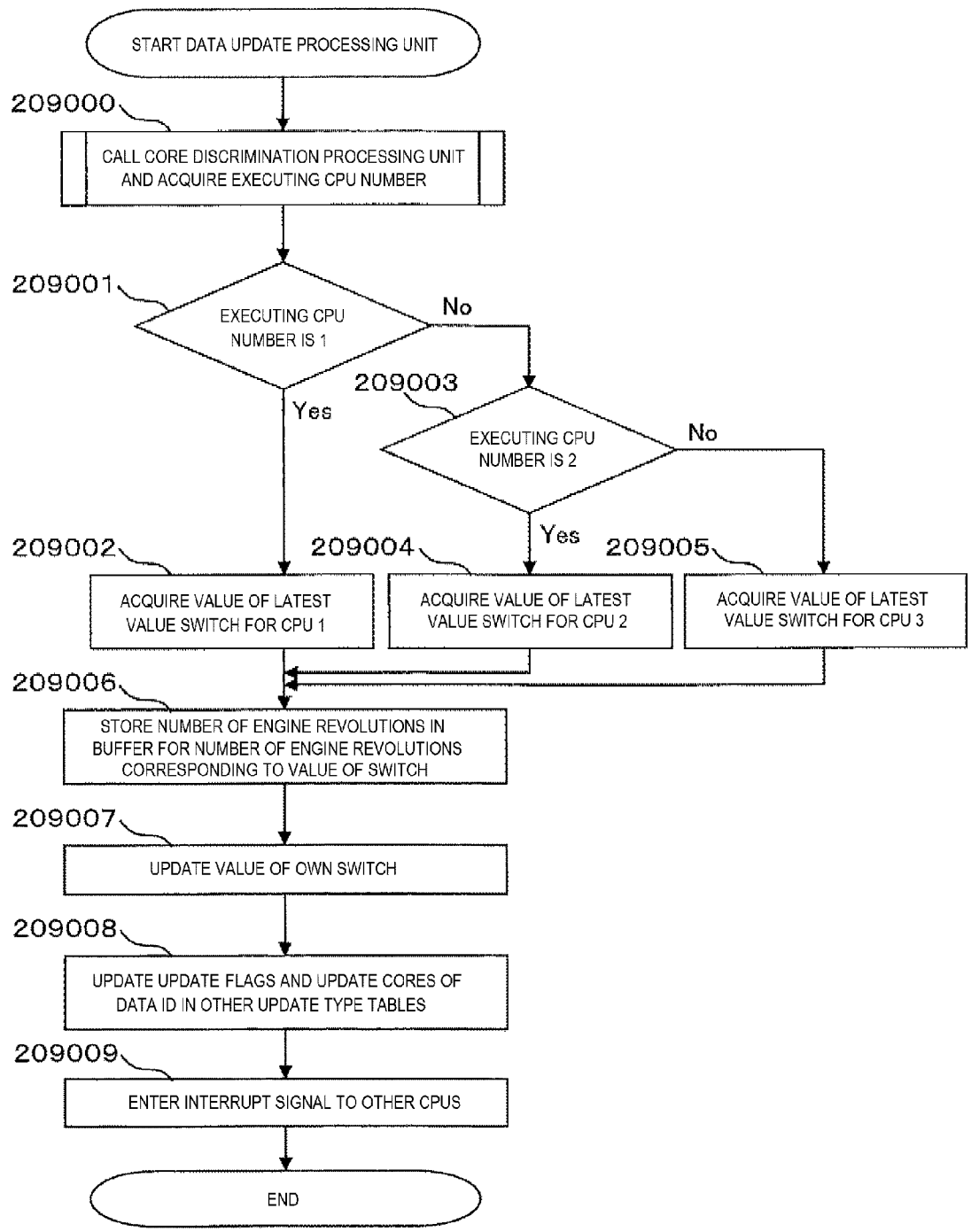
FIG. 19 is an operation flow of a data update processing unit according to Embodiment 2.

FIG. 19 is an operation flow of the data update processing unit 209. Hereinafter, each step in FIG. 19 will be described.
(FIG. 19: Step 209000)

The data update processing unit 209 calls the core discrimination processing unit 212 and acquires the CPU number that is executing the data update processing unit 209.
(FIG. 19: Step 209001)

The data update processing unit 209 goes to Step 209002 if the acquired CPU number is 1, and goes to Step 209003 if the CPU number is not 1, for example, the CPU number is 2 or 3.

(FIG. 19: Step 209002)

The data update processing unit 209 acquires the value of the latest value switch for CPU 1 214.

(FIG. 19: Step 209003)

The data update processing unit 209 goes to Step 209004 if the acquired CPU number is 2, and goes to Step 209005 if the CPU number is not 2, for example, the CPU number is 3.

(FIG. 19: Step 209004)

The data update processing unit 209 acquires the value of the latest value switch for CPU 2 215.

(FIG. 19: Step 209005)

The data update processing unit 209 acquires the value of the latest value switch for CPU 3 216.

(FIG. 19: Step 209006)

The data update processing unit 209 stores the number of engine revolutions in the buffer for the number of engine revolutions corresponding to the value of the switch. For example, if the value of the switch is 0, the number of engine revolutions which is the latest value is stored in the number of engine revolutions B 221.

(FIG. 19: Step 209007)

The data update processing unit 219 updates the value of its own switch. For example, if the arithmetic unit 201 updates the number of engine revolutions B 221, the value of the latest value switch for CPU 1 214 is updated to 1.

(FIG. 19: Step 209008)

The data update processing unit 219 updates the update flags and update cores of the data ID in the other update type tables. For example, if the value of the latest value switch for CPU 1 214 is updated, the update flags and update CPUs in the update type table for CPU 2 218 and the update type table for CPU 3 219 corresponding to the data ID indicating the latest value switch for CPU 1 of the number of engine revolutions are updated.

(FIG. 19: Step 209009)

The data update processing unit 209 enters an interrupt signal to the other CPUs. In Embodiment 2, the interrupt signal is entered to report the update to the other CPUs. However, this method is not limiting.

In this way, the number of engine revolutions in the shared memory can be updated.

Figure 20:
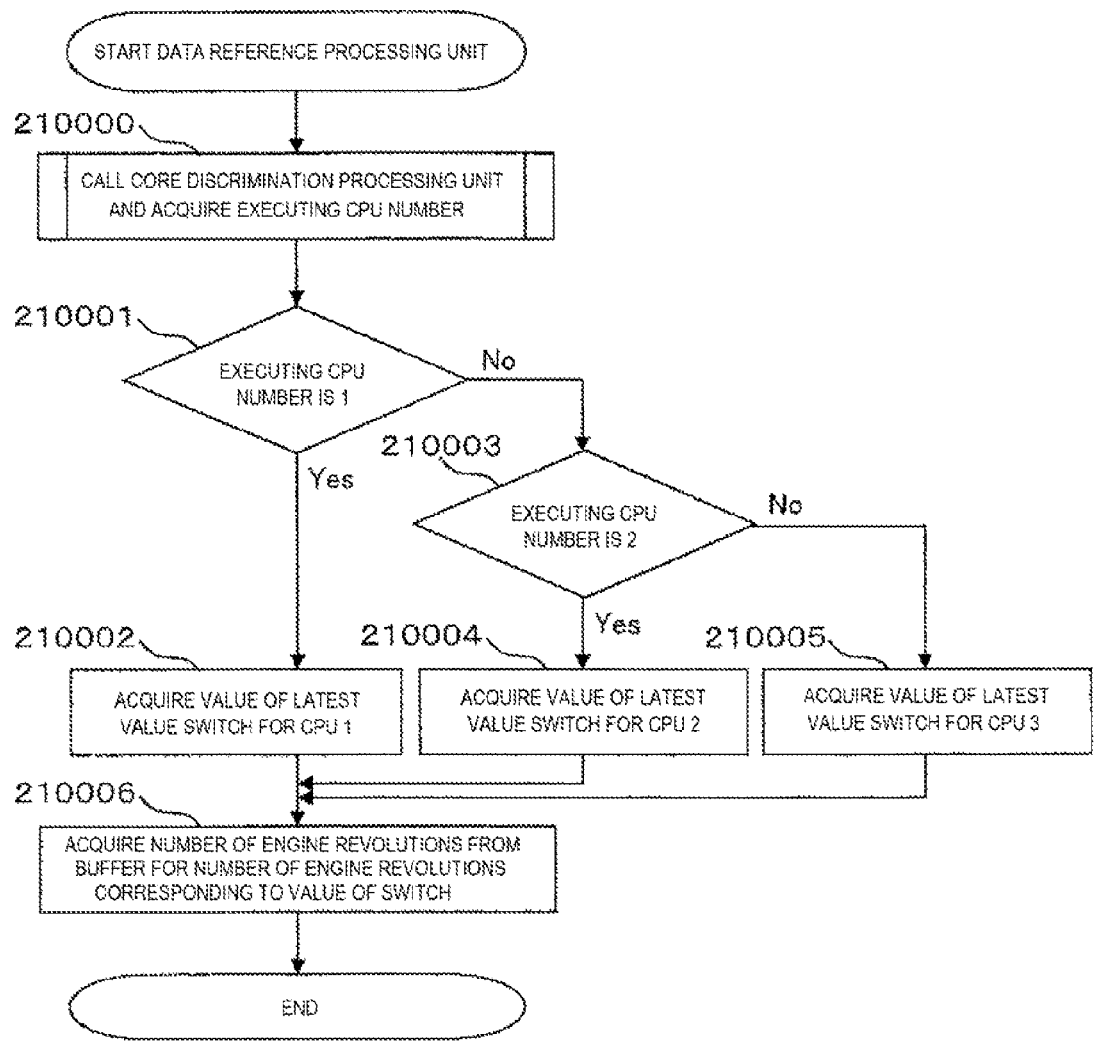
FIG. 20 is an operation flow of a data reference processing unit according to Embodiment 2.

FIG. 20 is an operation flow of the data reference processing unit 210. Hereinafter, each step in FIG. 20 will be described.

(FIG. 20: Step 210000)

The data reference processing unit 210 calls the core discrimination processing unit 212 and acquires the CPU number that is executing the data reference processing unit 210.

(FIG. 20: Step 210001)

The data reference processing unit 209 goes to Step 210002 if the acquired CPU number is 1, and goes to Step 210003 if the CPU number is not 1, for example, the CPU number is 2 or 3.

(FIG. 20: Step 210002)

The data reference processing unit 210 acquires the value of the latest value switch for CPU 1 214.

(FIG. 20: Step 210003)

The data reference processing unit 210 goes to Step 210004 if the acquired CPU number is 2, and goes to Step 210005 if the CPU number is not 2, for example, the CPU number is 3.

(FIG. 20: Step 210004)

The data reference processing unit 210 acquires the value of the latest value switch for CPU 2 215.

(FIG. 20: Step 210005)

The data reference processing unit 210 acquires the value of the latest value switch for CPU 3 216.

(FIG. 20: Step 210006)

The data reference processing unit 210 reads the number of engine revolutions from the buffer for the number of engine revolutions corresponding to the value of the switch. For example, if the value of the switch is 1, the number of engine revolutions which is the latest value is acquired from the number of engine revolutions B 221.

In this way, the number of engine revolutions in the shared memory can be acquired.

Figure 21:
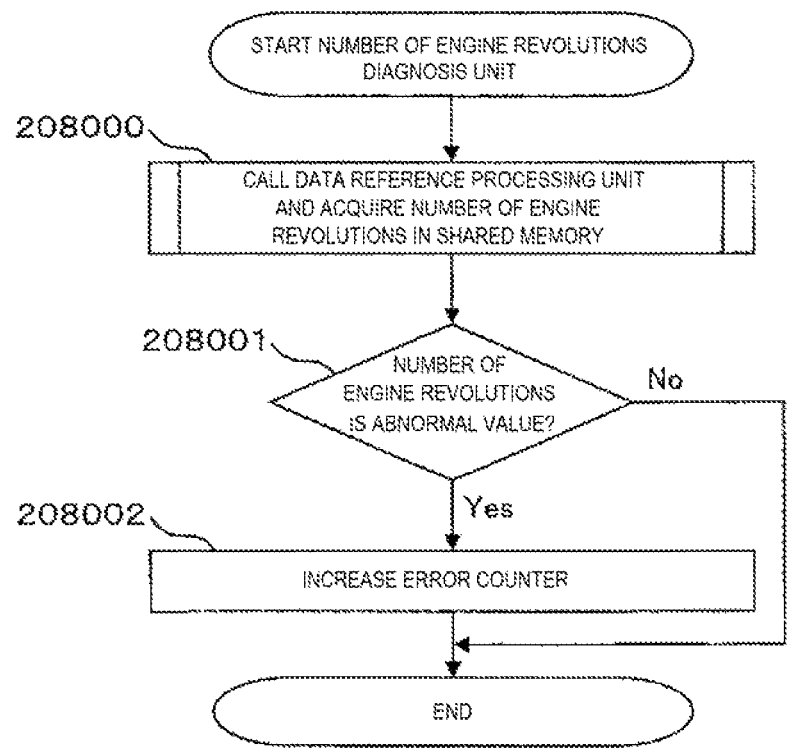
FIG. 21 is an operation flow of a number of engine revolutions diagnostic processing unit.

FIG. 21 is an operation flow of the number of engine revolutions diagnosis unit 208. Hereinafter, each step in FIG. 21 will be described.

(FIG. 21: Step 208000)

The number of engine revolutions diagnosis unit 208 calls the data reference processing unit 210 and acquires the number of engine revolutions stored in the shared memory.

(FIG. 21: Step 208001)

The number of engine revolutions diagnosis unit 208 goes to Step 208002 if the value of the number of engine revolutions is out of a normal value range for determining whether the value of the number of engine revolutions is within a normal value range, and ends the processing if the value is within the normal value range. However, the method for determining abnormality is not limited to this.

(FIG. 21: Step 208002)

The number of engine revolutions diagnosis unit 208 increments the value of the error counter 222. For example, 1 is added to the value of the error counter 222. However, this is not limiting.

In Embodiment 2, data is multiplexed. In the case of referring to data, a value is read out from the data indicated by the latest value switch. In the case of updating data, a value is written into the data that is not indicated by the latest value switch. The CPU that updates the data reports the update of the data to other CPUs without any delay after the data update. In response to this, the CPU that refers to the data can refer to the latest value without any delay. It should be noted that while the switches are used in this embodiment, this is not limiting. For example, a pointer indicating the latest value and a pointer indicating an update target may be used for the implementation. However, using the switches instead of pointers can improve reliability better.

In this way, according to this Embodiment 2, it is possible to update or refer to data, using the shared memory without using exclusive control even if there are three or more arithmetic units. Therefore, the technique is suitable for a vehicle system where data needs to be communicated at a high speed between plural arithmetic units, as in engine control.

REFERENCE SIGNS LIST 1 engine control ECU
101, 102 arithmetic unit
103 shared memory
104 program area
105 engine revolution calculating unit
106 fuel injection control unit
107 data update processing unit
108 data reference processing unit
109 data synchronizing unit
111 data storage area
112 update type table for CPU 1
113 update type table for CPU 2

114 number of engine revolutions for CPU 1
115 number of engine revolutions for CPU 2

The invention claimed is:

1. A control device for a vehicle including plural arithmetic units and a memory, shared by the plural arithmetic units, in which shared data accessed in common by the plural arithmetic units is stored redundantly, wherein in the control device
the shared memory has a program area and a data area,
the data area has plural data buffers in which the shared data is stored redundantly, corresponding to each of the plural arithmetic units, wherein the program area includes:
a data update processing unit for one arithmetic unit of the plural arithmetic units to update a data buffer corresponding to the one arithmetic unit, store new shared data, and report the update of the shared data to another control device of the plural arithmetic units;
a data synchronizing unit for another arithmetic unit of the plural arithmetic units to copy the shared data in the data buffer corresponding to the one arithmetic unit to the data buffer corresponding to the another arithmetic unit after the report; and
a data reference processing unit for the another arithmetic unit to refer to the data buffer corresponding to the another arithmetic unit, and wherein
a number of engine revolutions diagnosis unit calls the data reference processing unit and acquires a number of engine revolutions stored in the shared memory, and
the number of revolutions diagnosis unit ends processing if a value of the number of engine revolutions is within a normal range, and increments a value of an error counter if the value of the number of engine revolutions is out of the normal range.

2. The control device for a vehicle according to claim 1, wherein the data area includes information of types of the plural data buffers, presence/absence of change, and an identifier of a changed arithmetic unit, and has an update type table that is multiplexed in a number equal to or greater than the number of the plural arithmetic units.

3. The control device for a vehicle according to claim 1, wherein the shared data is a control value that is necessary to control onboard equipment.

4. The control device for a vehicle according to claim 3, wherein information that can specify a data buffer to store the control value therein is stored in the shared data.

5. The control device for a vehicle according to claim 1 having a core discriminating unit which identifies an arithmetic unit that is executing processing, and which returns an identifier of the arithmetic unit.

6. The control device for a vehicle according to claim 5, wherein the data update processing unit switches the data buffer that is a target where shared data is to be updated, according to the identifier of the arithmetic unit acquired by the core discriminating unit, and
the data reference processing unit switches the data buffer that is a target where shared data is to be referred to, according to the identifier of the arithmetic unit acquired by the core discriminating unit.

7. The control device for a vehicle according to claim 2, wherein the data update processing unit changes an update type table containing a type of shared data, presence/absence of update of shared data, and an identifier indicating the one arithmetic unit, thereby carrying out the report.

8. The control device for a vehicle according to claim 1, wherein the report includes an interrupt signal to the another arithmetic unit.

9. The control device for a vehicle according to claim 7, wherein the data synchronizing unit specifies the type of the updated shared data based on the type of the update type table, determines whether copying is needed or not based on the presence/absence of change in the update type table, and specifies the data buffer to be a copy source based on the identifier of the update type table, and the own arithmetic unit copies the value of the data buffer that is specified, to the data buffer.

10. The control device for a vehicle according to claim 1, wherein, without determining which of the plural arithmetic units executes an application, data is updated and referred to using the data update processing and data reference processing units.

11. A control device for a vehicle including plural arithmetic units and a memory, shared by the plural arithmetic units, in which shared data accessed in common by the plural arithmetic units is stored redundantly, wherein in the control device
the shared memory has a program area and a data area,
the data area has
plural data buffers in which the shared data is stored redundantly, and
plural latest value switches provided corresponding to each of the plural arithmetic units, and indicating a data buffer that is last updated, of the plural data buffers,
the program area includes:
a data update processing unit for one arithmetic unit of the plural arithmetic units to update one data buffer of the plural data buffers, based on a latest value switch corresponding to the one arithmetic unit, store new shared data, and report the update of the shared data to another control device of the plural arithmetic units;
a data synchronizing unit for copying the value of the latest value switch corresponding to the one arithmetic unit to the latest value switch corresponding to the another control device after the report; and
a data reference processing unit for another arithmetic unit of the plural arithmetic units to refer to one data buffer of the plural data buffers, based on the latest value switch corresponding to the another control device, and wherein
a number of engine revolutions diagnosis unit calls the data reference processing unit and acquires a number of engine revolutions stored in the shared memory, and
the number of revolutions diagnosis unit ends processing if a value of the number of engine revolutions is within a normal range, and increments a value of an error counter if the value of the number of engine revolutions is out of the normal range.

* * * * *